Feb. 17, 1959 A. W. LINDEMANN 2,873,757
CONTROL APPARATUS

Filed Oct. 8, 1956 3 Sheets-Sheet 1

INVENTOR.
ARTHUR W. LINDEMANN
BY
ATTORNEY

United States Patent Office 2,873,757
Patented Feb. 17, 1959

2,873,757
CONTROL APPARATUS

Arthur W. Lindemann, Columbia Heights, Minn., assignor to Minneapolis-Honeywell Regulator Company, Minneapolis, Minn., a corporation of Delaware Application October 8, 1956, Serial No. 614,637

13 Claims. (Cl. 137—101.25)

The present invention is concerned with a control apparatus, and more particularly with a control apparatus responsive to liquid quantity in a first and second liquid container to measure the quantity of liquid in the containers and to control means in accordance with the center of gravity established by the liquid in the containers. Specifically, the preferred embodiments of this invention show means whereby the quantity of aircraft fuel in a forward and an aft aircraft fuel tank is measured and wherein the center of gravity established by the fuel in the two tanks is sensed.

In present day long range and high speed aircraft the total quantity of fuel carried by the aircraft is large and it therefore becomes necessary to accurately gage this quantity of fuel so that a reasonable safety factor can be applied without unduly burdening the aircraft with an excessive amount of fuel over and above that necessary to complete a given flight. Furthermore, in order to extend the range of the aircraft, it has become common to place aircraft fuel tanks at the extremities of the aircraft. The fuel tanks of the aircraft determine to a great extent the center of gravity of the aircraft. As is well known, the basic design of the aircraft yields a mean aerodynamic cord, and for proper flight characteristics it is necessary that the center of gravity of the aircraft lie somewhere along this cord. It therefore becomes advisable to control the draining of fuel from the aircraft fuel tank in a manner in which the center of gravity of the aircraft remains in the desired range.

It is therefore an object of the present invention to provide a control apparatus for use with a pair of liquid containers to both sense the quantity of liquid in the containers and to sense the center of gravity established by the liquid in the containers.

It is a further object of the present invention to provide an improved control apparatus for use with an aircraft having a pair of fuel tanks wherein the apparatus responds to the total quantity of fuel in the aircraft fuel tanks and also to the center of gravity established by the fuel in these tanks.

These and other objects of the present invention will be apparent to those skilled in the art upon reference to the following specification, claims, and drawings, of which;

Figure 1:
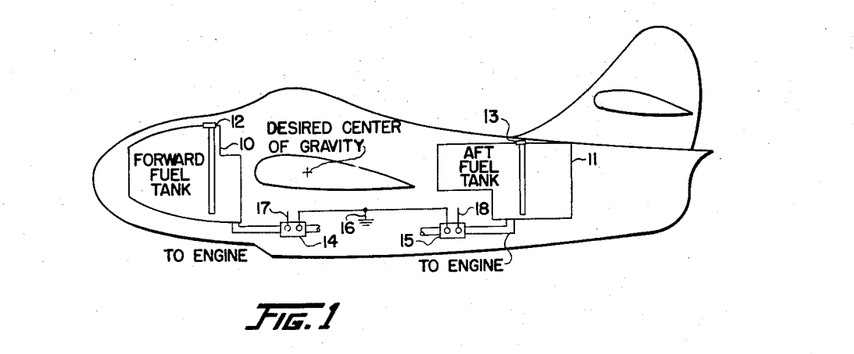
Figure 1 is a silhouette showing of an aircraft having a forward and an aft fuel tank.

Referring specifically to Figure 1, the reference numeral 10 designates the forward fuel tank while the reference numeral 11 designates the aft fuel tank of the aircraft. Each of these fuel tanks contains an impedance type liquid quantity sensor, 12 and 13. Each of the fuel tanks also includes an outlet conduit which feeds fuel to the aircraft engines, with this flow of fuel being controlled by valves 14 and 15. Valves 14 and 15 are of the type which are normally open and upon being electrically energized assume their closed position. In this manner, these valves provide a fail safe arrangement wherein when the electrical power to the valves fail, the valves assume their open position and insure that the fuel in the forward and aft fuel tanks is available to the aircraft engines. The valves 14 and 15 have a common electrical conductor which is connected to ground or reference potential at the connection 16. The reference numerals 17 and 18 designate electrical conductors which connect the switch means of Figures 4 and 5 to cause the valves 14 and 15 respectively to be energized as will be explained.

The basic design of the aircraft of Figure 1 yields a mean aerodynamic cord and it is desired that the center of gravity of the aircraft lie somewhere along this cord. In Figure 1, a point has been labeled desired center of gravity. The fuel in the forward and aft fuel tanks exert a moment about the desired center of gravity and, as will be explained, this moment can be controlled by controlling the withdrawal of fuel from the tanks 10 and 11 such that the center of gravity of the fuel in the two tanks coincides with the desired center of gravity of the aircraft.

Figure 2:
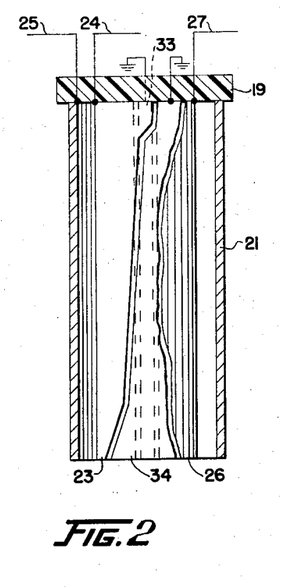
Figures 2 and 3 are representative showings of capacitance type liquid quantity sensors to be utilized with the modification of Figure 4 and to be placed in the forward and aft fuel tanks, respectively of Figure 1.
Figure 3:
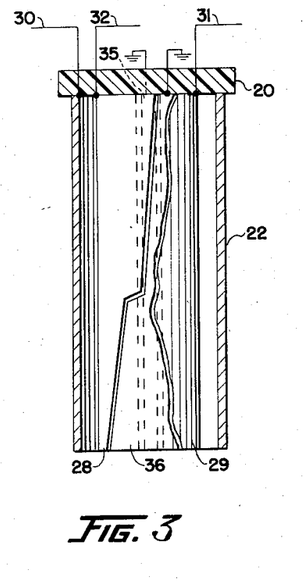

Figures 2 and 3 show particular types of impedance type liquid quantity sensors, in this case capacitance type liquid quantity sensors. The liquid quantity sensors of Figures 2 and 3 include three active capacitor electrodes, forming two capacitors with a common electrode, and having two grounded electrodes. The liquid quantity sensors of Figures 2 and 3 are particularly adapted for use in the modification of the invention shown in Figure 4. In the modification of the invention shown in Figure 5, the liquid quantity sensors consist of a single capacitor and may be of the type shown in the Earl C. Bowar Patent 2,560,757.

Referring specifically to Figures 2 and 3, the reference numerals 19 and 20 designate a mounting member of insulating material. Each of the liquid quantity sensors includes a first common electrode designated by the reference numeral 21 for the device of Figure 2 and with the reference numeral 22 for the device of Figure 3. The devices of Figures 2 and 3 are representative of devices to be utilized in the forward and the aft fuel tanks 10 and 11 respectively of the aircraft shown in Figure 1.

In the liquid quantity sensor of Figure 2, the reference numeral 23 designates the active capacitor electrode which is constructed so that the capacitor formed between electrodes 21 and 23 has the capacitance value which varies as a direct function of the quantity of fuel in the forward fuel tank 10. An electrical conductor 24 is provided and connects the electrode 23 to the electrical circuitry shown in Figure 4. The reference numeral 25 designates a further electrical conductor which connects the common electrode 21 to the electrical circuitry of Figure 4.

The second capacitor of the fuel quantity sensor of Figure 2 is made up of the common electrode 21 and a further electrode 26. Electrode 26 is connected to the electrical circuitry of Figure 4 by means of electrical conductor 27. The electrode 26 may take a variety of shapes. The considerations which are of prime importance in constructing electrode 26 are the manner in which the moment arm of the fuel in the forward fuel tank 10 varies as the total quantity of fuel in the tank varies. In other words, it can be seen from Figure 1 that since the forward fuel tank 10 has an irregular shape, the center of gravity of the fuel in the tank is not always the same distance from the point labeled desired center of gravity. Therefore, it is not possible to simply consider the quantity of fuel in the tank 10 but it is also necessary to consider what the moment arm of this fuel is. This can be taken into account by giving the electrode 26 a particular shape. Furthermore, it may be desirable under certain conditions to have the center of gravity of the aircraft vary in a predetermined manner as a function of the total quantity of fuel aboard the aircraft. This also can be taken into consideration when designing the shape of electrode 26.

Referring now to Figure 3, the reference numerals 28 and 29 designate further electrodes of the liquid quantity sensor of Figure 3 which correspond in their electrical function to the electrodes 23 and 26 of the apparatus of Figure 2. However, since the aft and forward fuel tanks are of a different shape, the electrodes 28 and 29 take a different shape from the electrodes 23 and 26. The reference numerals 30, 31 and 32 designate electrical conductors which connect the three capacitor electrodes 22, 29 and 28, respectively to the electrical circuitry of Figure 4.

In each of the fuel quantity sensors of Figure 2 and Figure 3 a pair of grounded patterns 33, 34, 35 and 36 are provided to control the electrostatic field between the active capacitor electrodes of the devices of Figures 2 and 3.

Figure 4:
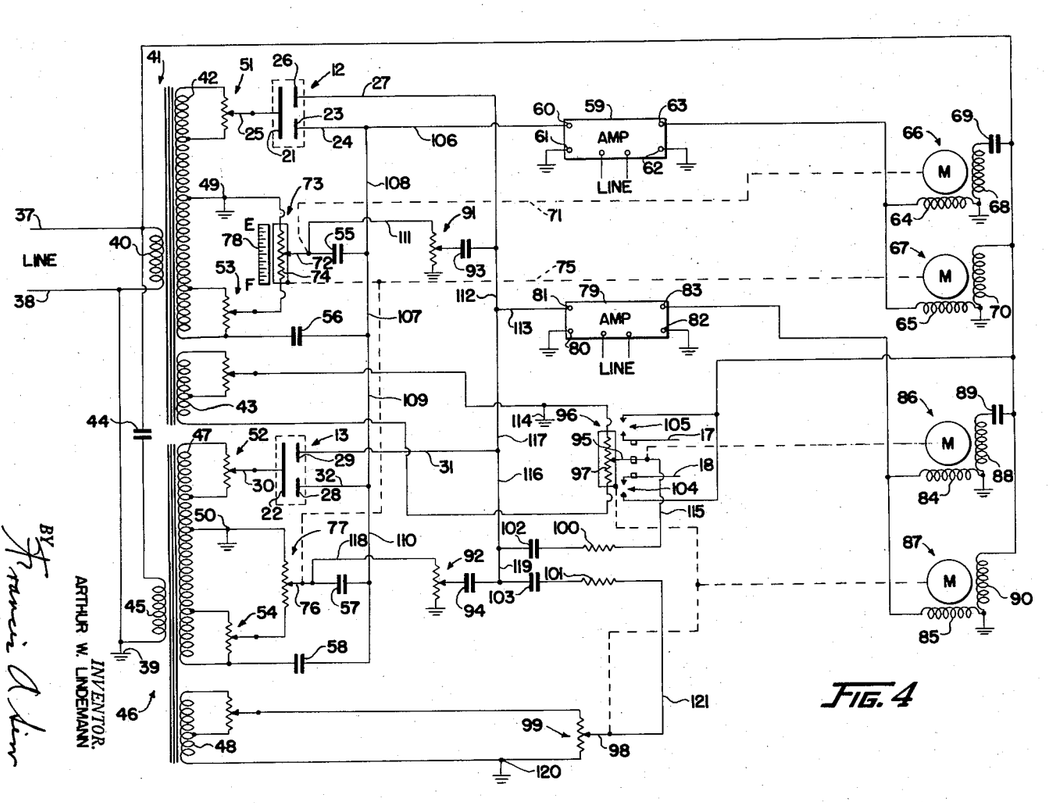
Figure 4 is a schematic showing of a first modification of the present invention.

Referring now to Figure 4, the impedance type liquid quantity sensors of Figures 2 and 3 are shown within broken lines and are designated by the reference numerals 12 and 13. These devices are represented as capacitance type devices having three electrodes and forming two capacitors. As mentioned above, the first of these capacitors has a capacitance value which varies as a direct function of the quantity of fuel in the forward and aft fuel tanks and the second capacitor has the capacitance value which varies as a predetermined function of the total quantity of fuel in the forward and aft fuel tank, taking into consideration the manner in which the moment arm of the fuel in the particular tank varies and other considerations such as scheduling the center of gravity of the aircraft in accordance with the total quantity of fuel aboard the aircraft. In the liquid quantity sensor 12 the first capacitor includes electrodes 21 and 23 and the second capacitor includes electrodes 21 and 26. In the liquid quantity sensor 13 the first capacitor includes the electrodes 22 and 28 and the second capacitor includes the electrodes 22 and 29.

Electrical power is supplied to the apparatus of Figure 4 from power line conductors 37 and 38 which are connected to a source of alternating voltage, not shown. The power line conductor 38 is connected to ground or reference potential at the connection 39. Power line conductors 37 and 38 are directly connected to the primary winding 40 of a transformer 41 having a first secondary winding 42 and a second secondary winding 43. The power line conductors 37 and 38 are also connected through a phase shifting capacitor 44 to the primary winding 45 of a transformer 46 having a first secondary winding 47 and a second secondary winding 48. From the above electrical connections, it can be seen that the voltage induced in the secondary windings of transformer 41 and in the secondary windings of transformer 46 are of a quadrature phase relationship.

The secondary windings 42 and 47 of transformers 41 and 46, respectively, are utilized in rebalanceable type capacitance bridge networks and each has a tap, 49 and 50, which is connected to a point of reference potential, namely ground potential. The upper portion of each transformer secondary winding includes a calibration potentiometer, 51 and 52, with the output of these potentiometers being electrically above ground potential. The lower portion of the transformer secondary windings include a calibration potentiometer, 53 and 54, with the output of these potentiometers being electrically below ground potential.

In the above mentioned capacitance bridge network, the fuel quantity sensors 12 and 13 are each located on one side of the two bridges while the capacitors 55, 56, 57 and 58 are located on the other side of the bridge networks.

Describing these bridges more completely, a first of these bridges includes the liquid quantity sensor 12 and capacitors 55 and 56 while the second bridge includes the liquid quantity sensor 13 and the capacitors 57 and 58. As will be described in greater detail later, the output of the bridge network is connected to the input of an amplifier 59 having a first input terminal 60 and a second input terminal 61 connected to reference potential. The output of amplifier 59 includes a grounded terminal 62 and a further terminal 63 which is connected to the control windings 64 and 65 of two phase motors 66 and 67 respectively. Motor 66 has a line voltage winding 68 which is connected through a phase shifting capacitor 69 to the power line conductor 37, the other terminal of both windings 64 and 68 being connected to ground potential. Since the line voltage winding 68 of motor 66 is connected to the power line conductors 37 and 38 through a phase shifting capacitor, this motor is responsive only to electrical currents flowing in its winding 64 which are in phase with the power line voltage.

The motor 67 has its line voltage winding 70 directly connected to the power line 37 and due to this connection, the motor 67 is responsive only to electrical currents in its winding 65 which are of a quadrature phase to the power line voltage.

Motor 66 is connected, by means of mechanical connection 71, to control the position of a movable wiper 72 of a rebalance potentiometer 73 having a resistance element 74. Motor 67 is connected by means of mechanical connection 75 to both control the position of potentiometer wiper 76 of rebalance potentiometer 77, and to control the physical position of the resistance element 74 of rebalance potentiometer 73.

Considering this particular feature in greater detail, the rebalance potentiometer 73 includes a resistance element 74 which is electrically connected from ground potential to the wiper of calibration potentiometer 53. This electrical connection is a fixed connection. However, the resistance element 74 is physically movable and its position is controlled by motor 67. The movable wiper 72 of potentiometer 73 is physically and electrically related with the resistance element 74 to make electrical contact to this resistance element. The position of the potentiometer wiper 72 is controlled by motor 66. The resistance element of potentiometer 77 is electrically connected in a similar manner to the resistance element of potentiometer 73. However, this resistance element is mounted so that it remains physically stationary, its potentiometer tap 76 being controlled by motor 67.

The relative position of movable tap 76 of potentiometer 77 and the resistance element of potentiometer 77 is indicative of the quantity of fuel in the aft fuel tank 11. The relative position of potentiometer wiper 72 and resistance element 74 of potentiometer 73 is indicative of the quantity of fuel in the forward fuel tank 10. Motor 66, which controls the position of potentiometer tap 72, is responsive to voltages of the phase derived from fuel quantity sensor 12 located in the forward fuel tank. Motor 67, which controls the position of potentiometer wiper 76 and potentiometer resistance element 74, is responsive to signals of the phase derived from fuel quantity sensor 13 located in the aft fuel tank. With such an electrical and mechanical arrangement the position of potentiometer tap 72 with respect to a stationary fuel quantity scale 78 indicates the total quantity of fuel in the forward and aft fuel tanks. The fuel quantity scale 78 is stationary and does not move with either the potentiometer resistance element 74 or the potentiometer wiper 72 of potentiometer 73.

Thus far, the description of the apparatus of Figure 4 has been confined to the fuel quantity measuring portion. The apparatus of Figure 4 includes a second amplifier 79 having a grounded input terminal 80 and a second input terminal 81. Amplifier 79 is utilized in the center of gravity portion of the apparatus of Figure 4. The output of amplifier 79 has a first terminal 82 which is connected to ground potential and has a second terminal 83 which is connected to the control windings 84 and 85 of two phase motors 86 and 87 respectively. The line voltage winding 88 of motor 86 is connected to the power line conductor 37 through a phase shifting capacitor 89 while the line voltage 90 of motor 87 is directly connected to the power line conductor 37. In this manner, motor 86 is made to be responsive to currents of the power line phase while motor 87 is responsive to currents of a phase quadrature to the power line phase.

Amplifiers 59 and 79 are each a conventional linear type amplifier, that is they are amplifiers which produce an amplified reproduction of the input signal at the output of the amplifier.

The input signal of amplifier 79 is derived from the second capacitors of the fuel quantity sensors 12 and 13 and likewise is derived from the rebalance potentiometer wipers 72 and 76 through voltage dividing means in the form of potentiometers 91 and 92 and through impedances in the form of capacitors 93 and 94.

Operation of motor 86 controls the position of a potentiometer wiper 95 of potentiometer 96 having a resistance element 97. Operation of motor 87 controls the position of the resistance element 97 of potentiometer 96 and likewise controls the position of potentiometer wiper 98 of potentiometer 99. The physical relationship of motors 86 and 87 and potentiometers 96 and 99 is identical to that of motors 66 and 67 and potentiometers 73 and 77, above described. In other words, both the resistance element and the potentiometer wiper of potentiometer 96 is movable while only the potentiometer wiper of potentiometer 99 is movable.

The resistance element 97 of potentiometer 96 is connected to the secondary winding 43 of transformer 41 and thereby has a voltage of the line voltage phase on the wiper thereof. The resistance element of potentiometer 99 is connected to the secondary winding 48 of transformer 46 and therefore has a voltage of a phase quadrature to the line voltage phase on the wiper thereof. The voltages present on the wipers 95 and 98 of potentiometers 96 and 99 constitute the rebalance voltages and are applied to the input of amplifier 79 through impedance networks consisting of resistors 100 and 101 and capacitors 102 and 103.

The position of potentiometer wiper 95 controls the operation of a pair of switches 104 and 105. These switches control the draining of the aircraft fuel tanks 10 and 11 by controlling energization of the valves 14 and 15 of Figure 1. Each of the switches 104 and 105 has a blade which is connected to power line conductor 37. The other blade of each switch is connected to an electrical conductor, and when one of the switches is closed an electrical circuit is completed to ground potential through one of the valves 14 and 15. In this manner, the flow of fuel from the tanks maintains the center of gravity of the aircraft at a desired range of positions.

*Operation of Figure 4*

In considering the operation of Figure 4, the fuel quantity measuring portion will first be described. As above mentioned, amplifier 59 and motors 66 and 67 are a portion of the fuel quantity measuring apparatus. The input currents for amplifier 59 can be traced as follows. A first of these currents flows in a circuit from the grounded secondary tap 49 through the upper portion of secondary winding 42, calibration potentiometer 51, conductor 25, capacitor 21—23, conductors 24 and 106 to input terminal 60 of amplifier 59. A second circuit can be traced from grounded connection 49 through the lower portion of transformer secondary 42, capacitor 56, conductors 107, 108 and 106 to input terminal 60. A third circuit can be traced from grounded connection 49 through rebalance potentiometer 73, capacitor 55, and conductors 108 and 106 to input terminal 60. It can be seen from the above traced circuits that the currents in these circuits are of the line voltage phase, with the current in the first traced circuit being displaced 180° from the currents in the second and third traced circuits.

Three further circuits which supply currents of a quadrature phase to the input of amplifier 59 will now be traced. The fourth can be traced from grounded connection 50 through the upper portion of secondary winding 47, calibration potentiometer 52, conductor 30, capacitor 22—28, conductors 32, 109, 107, 108 and 106 to input terminal 60. A fifth circuit can be traced from ground connection 50 through the lower portion of secondary winding 47, capacitor 58, conductors 110, 109, 107, 108 and 106 to input terminal 60. A sixth circuit can be traced from ground connection 50 through rebalance potentiometer 77, capacitor 57, conductors 110, 109, 107, 108 and 106 to input terminal 60. It can be seen in these last three traced circuits supply currents to the input of amplifier 59 are of a phase quadrature to the line voltage phase, with the current in the fourth traced circuit being 180° out of phase with respect to the current in the fifth and sixth traced circuits.

The current flowing in the above traced circuits including capacitors 56 and 58 are fixed components of current and are of a magnitude to balance out the empty tank capacitance value of the respective capacitors 21—23 and 22—28.

The currents flowing in the circuits including the measuring capacitors 21—23 and 22—28 have their magnitude controlled by the quantity of fuel in the forward and aft fuel tanks respectively of the aircraft. These particular measuring currents are variable in accordance with the quantity of fuel in the fuel tanks and these variable currents are balanced out by the currents flowing through the capacitors 55 and 57, the magnitude of these currents being controlled by the position of potentiometer wipers 72 and 76, which in turn are controlled by motors 66 and 67.

It will be remembered that the respective motors 66 and 67 are responsive to currents of the line voltage phase and a quadrature phase. Therefore, if it is assumed that the current flowing through capacitor 21—23 is greater than the sum total of the current flowing through capacitors 55 and 56, an alternating voltage of the line voltage phase is applied to the control winding 64 of motor 66 and this motor positions wiper 72 to increase the current flow through capacitor 55, that is by moving potentiometer wiper 72 in a downward direction, and thereby balances this bridge.

If it is now assumed that the electrical current flowing to the input of amplifier 59 through the capacitor 22—28 is greater than the sum total of the current flowing through capacitors 57 and 58, an alternating voltage of a phase quadrature to the line voltage phase is applied to the control winding 65 of motor 67. This causes the movable wiper 76 of potentiometer 77 to be positioned to increase the current flow through capacitor 57 until this bridge is balanced. This movement is in a downward direction.

It will be remembered that motor 67 also positions the resistance element 74 of potentiometer 73. This movement is likewise in a downward direction. Wiper 72 follows movement of the resistance element 74 since motor 66 always drives potentiometer wiper 72 to the position wherein its bridge is balanced. Therefore, as the quantity of fuel in either the forward or the aft fuel tank varies the position of wiper 72 changes with respect to the fuel quantity scale 78 and the total quantity of fuel in the two fuel tanks is indicated.

More specifically, a change of fuel in the forward fuel tank wherein the fuel quantity sensor 12 is located causes relative movement between potentiometer wiper 72 and resistance element 74 and likewise causes relative movement between potentiometer wiper 72 and indicator scale 78. However, there is no relative movement between the potentiometer resistance element 74 and the scale 78. Potentiometer wiper 72 in cooperation with scale 78 indicates the new total quantity of fuel aboard the aircraft. When the quantity of fuel in the aft fuel tank associated with the fuel quantity sensor 13 changes, the motor 67 is effective to move both the potentiometer tap 76 and the potentiometer resistance elements 74. In this case, the potentiometer wiper 72 follows movement of potentiometer resistance element 74 and there is no relative movement between wiper 72 and element 74. However, there is relative movement between potentiometer wiper 72 and scale 78 and the position of potentiometer wiper 72 again indicates the new quantity of fuel aboard the aircraft.

Referring now to operation of the center of gravity portion of the apparatus of Figure 4, the following input circuit currents for amplifier 79 can be traced. The first circuit can be traced from ground connection 49 through potentiometer 73, conductor 111, potentiometer 91, capacitor 93, conductor 112 and 113 to the input terminal 81 of amplifier 79. The magnitude of the current in this first traced circuit is controlled by the voltage present on potentiometer wiper 72, which is a voltage indicative of the total quantity of fuel in the forward fuel tank 10, as well as the setting of potentiometer 91. Potentiometer 91 is manually adjusted and its position is representative of the moment arm of the fuel in the forward fuel tank 10. It is recognized that because of the irregular shape of forward fuel tank 10 this moment arm is not constant and the varying effect of this moment arm is corrected by the following second traced circuit. This second traced circuit can be traced from ground connection 49 to the upper portion of transformer secondary winding 42, calibration potentiometer 51, capacitor 21—26, and conductors 27, 112 and 113 to the input terminal 81 of amplifier 79. The currents flowing in this first and second traced circuits are of the line voltage phase, with the current flowing through capacitor 21—26 being 180° out of phase with respect to the current flowing through capacitor 93. The net resultant current of these two currents is a current which is indicative of the moment of the fuel in the forward tank with respect to a particular axis in the aircraft, in this case being the point labeled desired center of gravity of Figure 1.

A third circuit, of the line voltage phase, to the input of amplifier 79 can be traced from ground connection 114 through potentiometer 96, conductor 115, resistor 100, capacitor 102, conductors 116, 117 and 113 to the input terminal 81 of amplifier 79. The voltage across potentiometer 96 is derived from the secondary winding 43 of transformer 41 and the connections of this particular secondary winding are such that the voltage on wiper 95 of potentiometer 96 is always above ground potential, that is the current in this third traced circuit aids the current in the above traced second circuit including capacitor 21—26 and the sum total of these two currents is adjusted by operation of motor 86 to cause a total of these two currents to be equal to the current flowing through capacitor 93. In this condition, the position of potentiometer tap 95 is indicative of the moment of the fuel in the forward fuel tank 10.

Three further circuits can be traced to the input of amplifier 79, these circuits providing electrical currents of a phase quadrature to the line voltage phase. The fourth circuit to the input of amplifier 79 can be traced from ground connection 50 through the upper portion of transformer secondary winding 47, conductor 30, capacitor 22—29, conductors 31, 117 and 113 to the input terminal 81 of amplifier 79. A fifth circuit can be traced from ground connection 50 through potentiometer 77, conductor 118, potentiometer 92, capacitor 94, conductors 119, 116, 117 and 113 to the input terminal 81 of amplifier 79. Here again, the current flowing through the fifth above traced circuit is controlled in magnitude by the position of wiper 76 of potentiometer 77, this being in turn indicative of the total quantity of fuel in the aft fuel tank 11. The setting of potentiometer 92 is such as to provide an electrical current flow through capacitor 94 which is indicative of the approximate moment of the fuel in the aft fuel tank 11. Here again, the current flow through the fourth above traced circuit including capacitor 22—29 is of a phase opposite to the current flow through capacitor 94 and capacitor electrode 29 is so constructed and arranged that an electrical current is provided which when combined with the current through capacitor 94 provides a resultant current indicative of the exact moment of the fuel in the aft fuel tank 11, taking into account the irregular shape of the aft fuel tank. A sixth circuit can be traced through the input of amplifier 79 from ground connection 120, potentiometer 99, conductor 121, resistor 101, capacitor 103, and conductors 119, 116, 117 and 113 to the input terminal 81 of the amplifier 79.

The current flowing in the three last traced circuits are the phase quadrature to the line phase. The current flowing in the last traced circuit, that is the sixth circuit, flows due to the voltage across potentiometer 99 which in turn is derived from the secondary winding 48 of transformer 46. The connection of potentiometer 99 to the secondary winding is such that the voltage on potentiometer tap 98 is always above ground or reference potential. In this manner, the current flow in the last above traced circuit aids the current flow in the fourth above traced circuit, through capacitor 22—29 and thereby produces a sum total current which opposes the current flowing in the fifth above traced circuit, through capacitor 94.

Motor 86 is responsive to electrical currents of the line voltage phase. In other words, motor 86 is responsive to electrical currents flowing in the first three traced circuits while motor 87 is responsive to electrical currents flowing of the quadrature phase, namely currents in the last three traced circuits. Motor 86 is effective to cause wiper 95 of potentiometer 96 to be positioned to cause the current flow through capacitor 102 to be of a magnitude to balance out the current flowing through capacitor 93, recognizing that a portion of this current is balanced out by the current flow through capacitor 21—26. Furthermore, motor 87 is effective to control the position of potentiometer tap 98 and to cause the current flow through capacitor 103 to oppose the current flow through capacitor 94, recognizing that the current flow through capacitor 22—29 balances out a portion of this current.

Assume for the moment that more fuel drains from the aft fuel tank 11 than drains from the forward fuel tank 10. The potentiometer wiper 76 is controlled by motor 67 to move in an upward direction, thereby reducing the current flow through capacitor 94. This together with a change in correction signal from capacitor 22—29 causes an electrical signal to be applied to the input of amplifier 79 which causes motor 87 to drive the potentiometer tap 98 in a downward direction to thereby cause the electrical current flow through capacitor 103 to again rebalance the center of gravity network. At the same time that the potentiometer wiper 98 is moved in the downward direction, the potentiometer resistance element 97 is moved in the downward direction. The potentiometer wiper 95 follows the resistance element 97 to maintain electrical contact at the same relative position. In other words, there is no relative movement between these two members. As potentiometer tap 95 moves in a downward direction the switch 104 is closed and this completes a circuit through conductor 18 to valve 15 energizing this valve. Energization of this valve closes the outlet conduit of aft fuel tank 11 and causes fuel to be drained only from the forward fuel tank, thereby causing potentiometer wiper 72 to move in an upward direction. This reduces the electrical current flow through capacitors 93 and 21—21 to a lesser degree and this in turn causes motor 86 to move potentiometer wiper 95 in an upward direction. This causes switch 104 to again assume its open position, allowing both tanks to again drain at the same time. In this manner, the center of the craft is controlled by controlling the operation of the valves 14 and 15.

Figure 5:
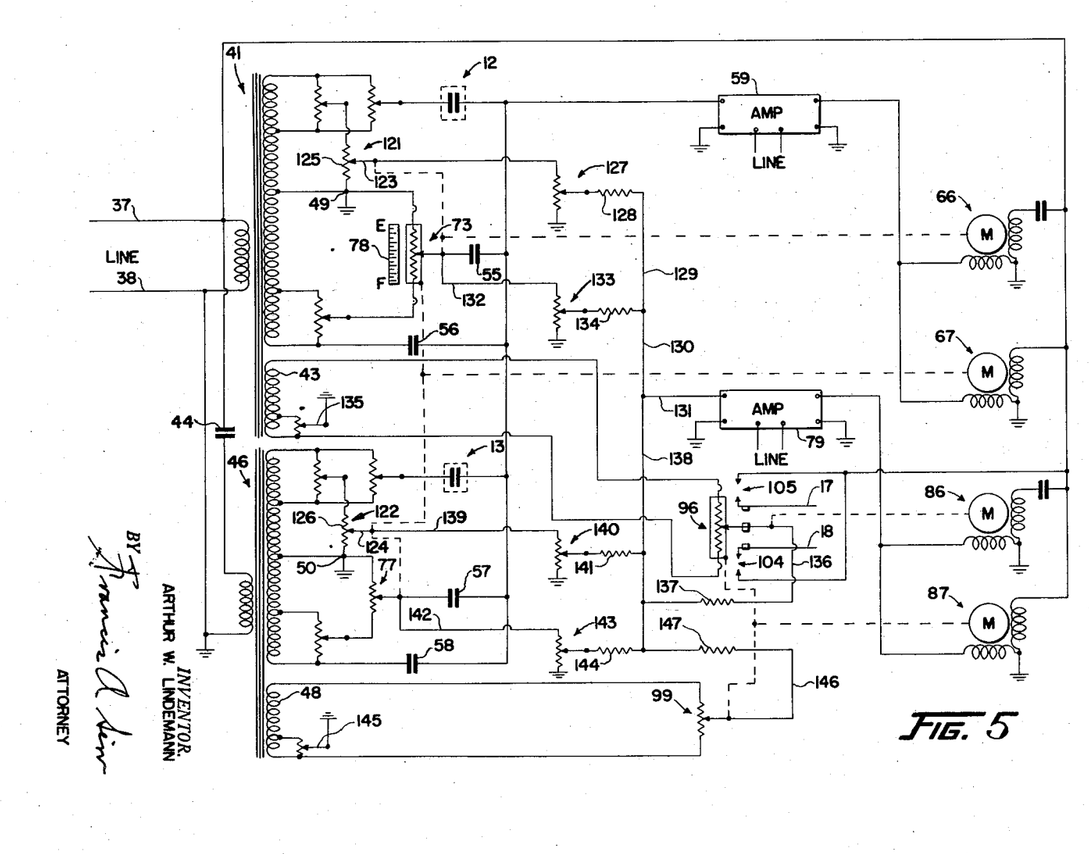
Figure 5 is a schematic representation of a second modification of the present invention.

*Figure 5*

Referring now specifically to Figure 5, this figure shows a schematic representation of a modification of the present invention. In this modification the fuel quantity sensing means 12 and 13 are in the form of capacitors having a single pair of electrodes with the fuel acting as dielectric. The capacitance value of these fuel quantity sensors is a direct function of the quantity of fuel in the forward and aft fuel tanks respectively. The fuel quantity measuring portion of the apparatus of Figure 5 is substantially identical with the apparatus of Figure 4. In other words, the capacitors 55 and 56 are associated with the fuel quantity sensor 12 to provide a rebalanceable type bridge which receives its electrical energy from the secondary winding of transformer 41 having its primary winding directly connected to the line voltage conductors 37 and 38. The output of this bridge is applied to the input of amplifier 59 and motor 66 is responsive to currents of the line voltage phase to position the wiper of potentiometer 73.

Likewise, the capacitors 57 and 58 are associated with the fuel quantity sensor 13 in a rebalanceable capacitance bridge receiving its energization from a secondary winding of transformer 46 whose primary winding is connected through a phase shifting capacitor 44 to the line voltage conductors. The output of this bridge is applied to the input of amplifier 59 and motor 67 is arranged to be responsive to voltages of a phase quadrature to the line voltage phase and controls the position of both the wiper of potentiometer 77 and the resistance element of potentiometer 73. The wiper of potentiometer 73 cooperates with stationary scale 78 to indicate the total quantity of fuel aboard the aircraft.

Referring now the center of gravity portion of the apparatus of Figure 5, the apparatus of Figure 5 is provided with a pair of potentiometers 121 and 122 each having movable potentiometer wipers 123 and 124 and having characterized potentiometer resistance elements 125 and 126. The potentiometer taps 123 and 124 are controlled respectively by the motors 66 and 67. The resistance elements of these potentiometers are characterized in much the same fashion that the capacitor electrodes 26 and 29 of the fuel quantity sensors 12 and 13 of Figure 4 are constructed. In other words, the potentiometers 121 and 122 are constructed and arranged so that the voltage on the respective potentiometer wipers varies as a predetermined function of the total quantity of fuel in the fuel tanks 10 and 11 taking into account such considerations as the manner in which the center of gravity of the fuel in these particular tanks varies with the total quantity of fuel in the tank and the scheduling of the center of gravity of the aircraft as a function of the total quantity of fuel aboard the aircraft, if this is desired. As in Figure 4, the voltage supplied from the potentiometers 121 and 122 opposes the voltage present on the rebalance potentiometer taps of potentiometers 73 and 77 respectively.

Amplifier 79 of Figure 5 and the motors 86 and 87 function similar to the like components of Figure 4. Here again, there are six input circuits for amplifier 79. The first of these circuits can be traced from ground connection 49 through the characterized potentiometer 121, potentiometer 127, resistor 128, and conductors 129, 130 and 131 to the input of amplifier 79. A second circuit can be traced from ground connection 49 through potentiometer 73, conductor 132, potentiometer 133, resistor 134, and conductors 130 and 131 to the input of amplifier 79. The currents flowing in these two traced circuits are of the line voltage phase and are 180° out of phase with respect to each other. The wipers of potentiometers 127 and 133 are adjusted such that the resultant electrical current flowing into the input of amplifier 79 is indicative of the moment of the fuel in the forward fuel tank 10.

This resultant current is rebalanced by current flowing in a third circuit which can be traced from ground connection 135 through potentiometer 96, conductor 136, resistor 137, and conductors 138 and 131 to the input of amplifier 79. The voltage present in this last traced circuit is due to secondary winding 43 of transformer 41. The secondary winding 43 is connected to potentiometer 96 in such a manner that the voltage on this potentiometer wiper is always of a phase opposite to the voltage on the wiper of potentiometer 73. Motor 86 is responsive to voltages of the line voltage phase and is operative to control the wiper of potentiometer 96 such that the position of the wiper of potentiometer 96 with respect to the resistance element of this potentiometer is indicative of the moment of the fuel in the forward fuel tank 10.

Three further circuits can be traced through the input of amplifier 79. The fourth circuit can be traced from ground connection 50 through characterized potentiometer 122, conductor 139, potentiometer 140, resistor 141, and conductors 138 and 131 to the input of amplifier 79. The fifth circuit can be traced from ground connection 50 through potentiometer 77, conductor 142, potentiometer 143, resistor 144, and conductors 138 and 131 to the input of amplifier 79. The electrical currents flowing in these last two traced circuits are of a phase quadrature to the line voltage phase and are respectively 180° out of phase with each other. The resultant current flowing to the input of amplifier 79 due to these two currents is of a magnitude indicative of the moment of the fuel in the aft fuel tank 11. This current is rebalanced by a current flowing through a sixth circuit which can be traced from ground connection 145 through potentiometer 99, conductor 146, resistor 147 and conductors 138 and 131 to the input of amplifier 79. The voltage source in this last traced circuit is derived from secondary winding 48 of transformer 46 and is of the quadrature phase. The connection of the secondary winding to the resistance element of potentiometer 99 is arranged such that the voltage on the wiper of this potentiometer is always above ground, that is the current flowing in this sixth traced circuit always opposes the current flowing in the fifth traced circuit, that is the current flowing through potentiometer 77.

As in Figure 4, the motors 86 and 87 of Figure 5 respond respectively to electrical currents of the line voltage phase and of a phase quadrature to the line voltage phase. Motor 86 controls the position of the movable wiper of potentiometer 96 while the motor 87 controls the position of both the wiper of potentiometer 99 and the resistance element of potentiometer 96, the resistance element of potentiometer 99 always remaining stationary. Furthermore, in the manner above described with respect to Figure 4, the position of the tap of potentiometer 96 controls switches 104 and 105 to thereby control the valves 14 and 15 and control the center of gravity of the aircraft by controlling the draining of fuel from the forward and aft fuel tanks.

The preferred modifications of the present invention have been explained with reference to aircraft fuel tanks. The present invention is not to be limited to this arrangement since the present invention is applicable to any arrangement whereby it is desired to measure the quantity of fuel of a pair of liquid containers and to respond to the center of gravity established by the liquid in these containers. It is intended that the scope of the present invention be limited solely by the scope of the appended claims.

I claim as my invention:

1. Control apparatus for use with a pair of liquid containers comprising; a pair of impedance type liquid quantity sensors arranged to be located one in each of the containers and to have an impedance value which varies as a function of the quantity of liquid in the container, a source of alternating voltage of a first characteristic, current responsive means, circuit means connecting a first of said liquid quantity sensors to said first source of voltage and to said current responsive means to cause an electrical current to flow to said current responsive means which is of said first characteristic and of a magnitude indicative of the quantity of liquid in one of the containers, a second source of voltage of a second characteristic, circuit means connecting the other of said liquid quantity sensors to said second voltage source and said current responsive means to cause an electrical current to flow to said current responsive means which is of said second characteristic and of a magnitude which varies as a function of the quantity of liquid in the other of the containers, first motive means responsive only to currents of said first characteristic, second motive means responsive only to currents of said second characteristic, said first and second motive means connected to said current responsive means to be controlled thereby, and further means connected to said motive means jointly controlled thereby and operable to provide a signal in accordance with the total quantity of liquid in the containers.

2. Apparatus for use with a pair of liquid containers comprising; first and second impedance type liquid quantity sensors, a first source of alternating voltage of a first phase, amplifier means having an input, circuit means connecting said first liquid quantity sensor to said first source of voltage and to the input of said amplifier to cause an electrical current to flow to the input of said amplifier which is of said first phase and of a magnitude indicative of the quantity of liquid in one of the containers, a second source of alternating voltage of a phase quadrature to said first phase, circuit means connecting the other of said liquid sensors to said second source of voltage and to the input of said amplifier to cause an electrical current to flow to the input of said amplifier which is of said quadrature phase and of a magnitude indicative of the quantity of liquid in the other container, first phase responsive means responsive to electrical current of said first phase, second phase responsive means responsive to electrical currents of said quadrature phase, circuit means connecting said first and second phase responsive means to the output of said amplifier so as to cause each of said phase responsive means to be controlled by the respective currents of said first and said quadrature phase, and further means jointly controlled by said first and second phase responsive means so as to be indicative of the total quantity of liquid in the pair of containers.

3. Center of gravity apparatus for use with a pair of liquid containers comprising first and second impedance type liquid quantity sensors arranged to be positioned one in each of the containers and to have an impedance value indicative of the quantity of liquid in its particular container, a first source of voltage of a first characteristic, current responsive means, circuit means connecting said first source of voltage in series with a first of said liquid quantity sensors and said current responsive means to thereby cause an electrical current to flow to said current responsive means which is of said first characteristic and of a magnitude indicative of the quantity of liquid in the container wherein said first liquid quantity sensor is located, a second source of voltage of a second characteristic, circuit means connecting said second source of voltage in series with the other of said liquid quantity sensors and said current responsive means to cause an electrical current to flow to said current responsive means which is of said second characteristic and of a magnitude indicative of the quantity of liquid in the container wherein the other of said fuel quantity sensors is located, first means controlled by said current responsive means in accordance with the magnitude of the electrical current of said first characteristic to produce a voltage indicative of the moment of the liquid in the first container, second means controlled by said current responsive means in accordance with the magnitude of the electrical current of said second characteristic to produce a voltage indicative of the moment of the liquid in the second container, and voltage responsive means controlled by said first and second means to provide a signal in accordance with the center of gravity established by the liquid in the first and second containers.

4. Control apparatus for use with a pair of liquid containers comprising; first liquid quantity sensing means arranged to derive a voltage of a first characteristic and of a magnitude indicative of the quantity of liquid in a first of the containers, second liquid quantity sensing means arranged to derive a voltage of a second characteristic and of a magnitude indicative of the quantity of liquid in the second of the containers, first and second voltage dividing means, circuit means connecting said first and second liquid sensing means to said first and second voltage dividing means respectively to derive further voltages of said first and second characteristic and of respective magnitudes indicative of the moment of the liquid in the first and second containers with respect to a reference axis, voltage responsive means, circuit means connecting said voltage responsive means to said first and second voltage dividing means, first control means responsive to electrical voltages of said first characteristic, second control means responsive to electrical voltages of said second characteristic, means connecting said first and second control means to be controlled by said voltage responsive means, and further means jointly controlled by said first and second control means in accordance with the center of gravity established by the liquid in the first and second containers to provide an output control signal.

5. Control apparatus responsive to the center of gravity established by the liquid in a first and second liquid container comprising; first means responsive to the quantity of liquid in a first of the containers to derive an alternating voltage of a first phase and of a magnitude indicative of the quantity of liquid in the first container, second means responsive to the quantity of liquid in the second container to derive a voltage of a phase quadrature to said first phase and of a magnitude indicative of the quantity of liquid in the second container, first voltage dividing means having an input connected to said first means and having an output voltage indicative of the moment of the liquid in the first container, second voltage dividing means having an input connected to said second means and having an output voltage indicative of the moment of the fuel in the second container, first control means responsive to voltages of said first phase, second control means responsive to voltages of said quadrature phase, circuit means connecting said first and second control means to the output of said first and second voltage dividing means to thereby control said first and second control means in accordance with the magnitude of the voltages of said first and said quadrature phase respectively, and further means jointly controlled by said first and second control means in accordance with the center of gravity established by the liquid in the first and second containers to provide an electrical output signal.

6. Control apparatus for use with an aircraft having a pair of fuel tanks comprising; first and second impedance type fuel quantity sensors arranged to be located one in each of the aircraft fuel tanks and to have an impedance value which varies as a function of the quantity of fuel in each of the individual tanks, a first source of voltage of a first characteristic, amplifier means, circuit means connecting said first source of voltage, said first fuel quantity sensor and said amplifier means in a series circuit to thereby cause an electrical current to flow to said amplifier means which is of said first characteristic and of a magnitude indicative of the quantity of fuel in one of the aircraft fuel tanks, a source of voltage of a second characteristic, circuit means connecting said second source of voltage, said second fuel quantity sensor and said amplifier means in a series circuit to thereby cause an electrical current to flow to said amplifier means which is of said second characteristic and of a magnitude indicative of the quantity of fuel in the other aircraft fuel tank, first means responsive to currents of said first characteristic, second means responsive to currents of said second characteristic, means connecting said first and second means to be controlled by said amplifier means, indicator means controlled by operation of said first and second means to provide an indication of the total quantity of fuel in the first and second aircraft fuel tanks, a third source of voltage controlled by said first means arranged to derive a voltage of said first characteristic and of a magnitude indicative of the moment of the fuel in the first aircraft fuel tank, a fourth source of voltage controlled by said second means arranged to derive a voltage of said second characteristic and of a magnitude indicative of the moment of the fuel in the second aircraft fuel tank, a second amplifier, means connecting said third and fourth sources of voltage in controlling relation to said second amplifier, third means responsive to currents of said first characteristic, fourth means responsive to currents of said second characteristic, means connecting said third and fourth means to be controlled by said second amplifier, and further means jointly controlled by operation of said third and fourth means in accordance with the center of gravity of the fuel in the first and second aircraft fuel tanks to provide an electrical output signal.

7. Control apparatus for use with an aircraft having a first and a second fuel tank comprising; a first and a second capacitance type liquid quantity sensor arranged to be located in the first and second aircraft fuel tanks respectively and to have capacitance values indicative of the quantity of fuel in the first and second fuel tanks, a first source of alternating voltage of a first phase, an amplifier having an input, circuit means connecting said first source of voltage, said first liquid quantity sensor and said amplifier input in a series circuit to thereby cause an electrical current of said first phase and of a magnitude indicative of the quantity of fuel in one of the aircraft fuel tanks to flow to the input of said amplifier, a second source of alternating voltage of a phase quadrature to said first phase, circuit means connecting said second source of voltage, said second liquid quantity sensor and the said amplifier input in a series circuit to thereby cause an electrical current to flow to the input of said amplifier which is of said quadrature phase and of a magnitude indicative of the quantity of fuel in the other aircraft fuel tank, first motor means responsive to electrical currents of said first phase, second motor means responsive to electrical currents of said quadrature phase, circuit means connecting said first and second motor means to the output of said amplifier, fuel quantity indicator means jointly controlled by operation of said first and second motor means and providing an indication of the total quantity of fuel in the first and second aircraft fuel tanks, a third source of alternating voltage of said first phase and of a magnitude controlled by operation of said first motor means in accordance with the quantity of fuel in the one aircraft fuel tank, a fourth source of alternating voltage of said quadrature phase and of a magnitude controlled by operation of said second motor means in accordance with the quantity of fuel in the other aircraft fuel tank, first and second voltage dividing means each having an input connected to the third source of voltage of said first phase and the fourth source of voltage of said quadrature respectively and each having an output voltage indicative of the moment of the fuel in the one aircraft fuel tank and in the other aircraft fuel tank respectively, second amplifier having an input, means connecting said second amplifier input to the output of said first and second voltage dividing means, third motor means responsive to electrical currents of said first phase, fourth motor means responsive to electrical currents of said quadrature phase, means connecting said third and fourth motor means to the output of said second amplifier, and further means jointly controlled by operation of said third and fourth motor means in accordance with the summation of the moments of the fuel in the first and second aircraft fuel tanks to provide an output control signal.

8. Sensing apparatus for use with an aircraft having a pair of fuel tanks comprising; first fuel quantity responsive means responsive to the quantity of fuel in the first of the aircraft fuel tanks to provide a voltage of a first characteristic and of a magnitude indicative of the moment of the fuel in the first fuel tank, second fuel quantity responsive means responsive to the quantity of fuel in the second of the aircraft fuel tanks to provide a voltage of a second characteristic and of a magnitude indicative of the moment of the fuel in the second of the aircraft fuel tanks, a first source of voltage of said first characteristic and of a magnitude which varies as a predetermined function of the total quantity of fuel in the first aircraft fuel tank, a second source of voltage of said second characteristic and of a magnitude which varies as a predetermined function of the quantity of fuel in the second aircraft fuel tank, voltage responsive means, circuit means connecting said voltage responsive means to said first and second fuel quantity responsive means and said first and second source of voltage, first motor means controlled only by voltages of said first characteristic, second voltage means controlled only by voltages of said second characteristic, circuit means connecting said first and second motor means to said voltage responsive means to be controlled thereby, and further means controlled jointly by said first and second motor means to provide a signal in accordance with the center of gravity established by the fuel in the first and second aircraft fuel tanks.

9. Sensing apparatus for use with an aircraft having a pair of fuel tanks comprising; first fuel quantity responsive means arranged to derive an alternating voltage of a first phase and of a magnitude which varies as a direct function of the quantity of fuel in a first of the aircraft fuel tanks, second fuel quantity responsive means arranged to derive an alternating voltage of a phase quadrature to said first phase and of a magnitude which varies as a direct function of the quantity of fuel in the second aircraft fuel tank, a first source of alternating voltage of a phase opposite to said first phase and of a magnitude which varies as a predetermined function of the quantity of fuel in the first aircraft fuel tank, such that the said voltage of said first phase and said voltage of said phase opposite to said first phase provide a resultant voltage indicative of the moment of the fuel in the first aircraft fuel tank, a second source of alternating voltage of a phase opposite to said quadrature phase and of a magnitude which varies as a predetermined function of the quantity of fuel in the second aircraft fuel tank such that the said voltage of said quadrature phase and said voltage of said phase opposite to said quadrature phase provide a resultant voltage indicative of the moment of the fuel in the second aircraft fuel tank, first voltage responsive means responsive only to voltages of said first or opposite phase, second voltage responsive means responsive only to voltages of said quadrature or opposite phase, means connecting said first and second voltage responsive means to said first and second fuel quantity responsive means and said first and second voltage source, and further means jointly controlled by operation of said first and second voltage responsive means to provide a signal in accordance with the center of gravity established by the fuel in the first and second aircraft fuel tanks.

10. Fuel quantity and center of gravity control apparatus for use with an aircraft having a first and a second fuel tank comprising; a first and a second impedance type liquid quantity sensor arranged to be positioned one in each of the aircraft fuel tanks and to have an impedance value indicative of the quantity of fuel in its respective tank, a source of alternating voltage of a first phase having a point of reference potential and a first and second terminal located electrically on opposite sides of said point of reference potential, a second source of alternating voltage of a phase quadrature to said first phase and having a point connected to said reference potential and first and second terminals electrically located on opposite sides of said reference potential, an amplifier having a pair of input terminals, one of which is connected to said reference potential, circuit means connecting a first of said liquid quantity sensors to the first terminal of said first voltage source and to the second input terminal of said amplifier, circuit means connecting the second of said liquid quantity sensors to the first terminal of said second voltage source and to the second input terminal of said amplifier, first voltage dividing means having an input connected to the second terminal of said first source of voltage, second voltage dividing means having an input connected to the second terminal of said second voltage source, a first and second impedance, circuit means connecting said first impedance to the output of said first voltage divider and to the second input terminal of said amplifier, circuit means connecting said second impedance to the output of said second voltage divider and to the second input terminal of said amplifier, first motor means responsive to electrical voltages of said first phase and a phase opposite to said first phase, second motor means responsive to electrical voltages of said quadrature phase and a phase opposite to said quadrature phase, means connecting said first motor means in controlling relationship to said first voltage divider to thereby cause the electrical current supplied through said first impedance to be equal and opposite to the electrical current flowing due to the quantity of fuel in the first tank, means connecting said second motor means to control the output of said second voltage divider to thereby cause the electrical current flowing through said second impedance to be equal to the electrical current flowing due to the quantity of fuel in the second container, a third voltage divider having its input connected to the output of said first voltage divider, a fourth voltage divider having its input connected to the output of said second voltage divider, third and fourth impedance means, a second amplifier having a pair of input terminals one of which is connected to said reference potential, circuit means connecting said third impedance means to the output of said third voltage divider and to the second input terminal of said second amplifier, circuit means connecting said fourth impedance to the output of said fourth voltage divider and to the second input terminal of said second amplifier, said third and fourth voltage dividers being so arranged that the signals supplied to the input of said second amplifier through said third and fourth impedances respectively are indicative of the moment of the fuel in the first and second fuel tanks respectively, and further means jointly controlled by the output of said second amplifier in accordance with the center of gravity as established by the fuel in the first and second aircraft fuel tanks to control the flow of fuel therefrom.

11. Fuel quantity and center of gravity control apparatus for use with an aircraft having a first and second fuel tank comprising; a first capacitance type liquid quantity sensor having three electrodes forming two capacitors, a first of these capacitors having a capacitance value which varies as a direct function of the quantity of fuel in the tank wherein the sensor is located and the second capacitor having a capacitance value which varies as a predetermined function of the quantity of fuel in the fuel tank; a second capacitance type fuel quantity sensor having three electrodes forming two capacitors, a first of these capacitors having a capacitance value which varies as a direct function of the quantity of fuel in the tank wherein the sensor is located and the second capacitor having a capacitance value which varies as a predetermined function of the quantity of fuel in the fuel tank, a first source of alternating voltage of a first phase having a point connected to reference potential and having first and second terminals located electrically on opposite sides of said reference potential, a second source of alternating voltage having a point connected to said reference potential and having first and second terminals located electrically on opposite sides of said reference potential, amplifier means having a pair of input terminals, one of which is connected to said reference potential, circuit means connecting the said first capacitor of said first and second liquid quantity sensors to said first terminal of said first and second voltage sources respectively and to the second terminal of said amplifier input, first and second voltage dividing means, circuit means connecting the input of said first voltage dividing means to the second terminal of said first voltage source, circuit means connecting the input of said second voltage dividing means to the second terminal of said second voltage source, a first and second capacitor, circuit means connecting said first and second capacitors to the output of said first and second voltage dividing means respectively and to the second terminal of said amplifier input, first motor means connected to said amplifier and controlled only by voltages of said first or an opposite phase, second motor means connected to said amplifier and controlled only by voltages of said quadrature or an opposite phase, means connecting said first motor means in controlling relation to said first voltage divider to thereby cause the electrical current through said first capacitor to be equal to the electrical current flowing through the first capacitor of said first fuel quantity sensor, means connecting said second motor means in controlling relationship to said second voltage divider to thereby cause the current flow through said second capacitor to be equal and opposite to the current flow through the first capacitor of said second fuel quantity sensor, third and fourth voltage dividing means, means connecting the input of said third voltage dividing means to the output of said first voltage dividing means, means connecting the input of said fourth voltage dividing means to the output of said second voltage dividing means, a third and fourth capacitor, a second amplifier having a pair of input terminals, one of which is connected to said reference potential, circuit means connecting said third capacitor to the output of said third voltage divider and to the second input terminal of said second amplifier, circuit means connecting said fourth capacitor to the output of said fourth voltage divider and to the second input terminal of said second amplifier, circuit means connecting the second capacitors of said first and second fuel quantity sensors to said second input terminal of said second amplifier, and further means controlled by the output of said second amplifier in accordance with the center of gravity established by the fuel in the first and second fuel tanks to control the flow of fuel therefrom.

12. Fuel quantity and center of gravity control apparatus for use with an aircraft having a first and second fuel tank comprising; a pair of capacitance type fuel quantity sensors arranged to be located one in each of the aircraft fuel tanks and to have capacitance values indicative of the quantity of fuel in the respective fuel tanks, a first source of alternating voltage of a first phase having a terminal connected to reference potential and having first and second terminals electrically located on opposite sides of said reference potential, a second source of alternating voltage of a phase quadrature to said first phase having a terminal connected to said reference potential and having first and second terminals located electrically on opposite sides of said reference potential, a first amplifier having a pair of input terminals, one of which is connected to said reference potential, circuit means connecting the first terminal of said voltage source, said first liquid quantity sensor and the second input terminal of said first amplifier in a series circuit, circuit means connecting the first terminal of said second voltage source, said second liquid quantity sensor, and the second input terminal of said first amplifier in a series circuit, a first potentiometer having its resistance element connected to the second terminal of said first voltage source, a second potentiometer having its resistance element connected to the second terminal of said second voltage source, first and second capacitors, circuit means connecting the movable tap of said first potentiometer and said first capacitor in a series circuit to the second input terminal of said first amplifier, circuit means connecting the movable tap of said second potentiometer and said second capacitor in a series circuit to the second input terminal of said first amplifier, first motor means connected to the output of said first amplifier and responsive only to voltages of said first or an opposite phase, second motor means connected to the output of said first amplifier and responsive only to voltages of said quadrature or an opposite phase, a third potentiometer having its resistance element connected to the first terminal of said first voltage source, a fourth potentiometer having its resistance element connected to the first terminal of said second voltage source, the resistance elements of said third and fourth potentiometers being characterized as a predetermined function of the total quantity of fuel in the first and second aircraft fuel tanks respectively, means connecting said first motor means to control the movable wipers of said first and third potentiometers, means connecting said second motor means to control the position of said second and fourth potentiometer wipers, a second amplifier having a pair of input terminals, one of which is connected to said reference potential, circuit means connecting the potentiometer wipers of said first, second, third and fourth potentiometer wipers to the second input terminal of said second amplifier, third motor means connected to the output of said second amplifier and responsive only to voltages of said first or an opposite phase, fourth motor means connected to the output of said second amplifier in response only to voltages of said quadrature or an opposite phase, and further means jointly controlled by operation of said third and fourth motor means in accordance with the center of gravity established by the fuel in the first and second aircraft fuel tanks to control the flow of fuel therefrom.

13. Apparatus of the class described comprising, in combination: first and second liquid quantity sensors each adapted to produce an electrical signal of a magnitude indicative of the quantity of liquid being sensed in a first and second container respectively; a first source of alternating current voltage having a first electrical characteristic independent of magnitude; means connecting said first source of voltage to said first sensor; a second source of alternating current voltage having a second electrical characteristic independent of magnitude different from said first characteristic and capable of being distinguished therefrom; means connecting said second source of voltage to said second sensor; a first voltage responsive means having an input and an output; means connecting said sensors to the input of said first voltage responsive means; a third source of alternating current voltage having a variable magnitude and a sense opposite to the sense of said first characteristic; means connecting said third source of voltage to the input of said first voltage responsive means so that the signal from said first sensor is opposed; first motive means connected to the output of said first voltage responsive means, responsive only to signals of said first characteristic and its opposite and operable to vary the magnitude of said third source of voltage; a fourth source of alternating current voltage of variable magnitude and of sense opposite to the sense of said second characteristic; means connecting said fourth source of voltage to the input of said first voltage responsive means so that the signal from said second sensor is opposed; second motive means connected to the output of said first voltage responsive means, responsive only to signals of said second characteristic and its opposite and operable to vary the magnitude of said fourth source of voltage; first characterized means connected to said first source of voltage and capable of deriving a signal of magnitude which varies with the moment of the liquid in the first container with respect to an arbitrary axis; a second characterized means connected to said second source of voltage and capable of deriving a signal of magnitude which varies with the moment of the liquid in the second container with respect to the arbitrary axis; a fifth source of alternating current voltage of variable magnitude and having a characteristic of the same sense as said first characteristic; second voltage responsive means having an input and an output; means connecting said first characterized means, said fifth voltage source and said third voltage source to the input of said second voltage responsive means; third motive means connected to the output of said second voltage responsive means, responsive only to signals of said first characteristic and its opposite and operable to vary the magnitude of said fifth source of voltage; a sixth source of alternating current voltage of variable magnitude and having a characteristic of the same sense as said second characteristic; means connecting said second characterized means, said sixth voltage source and said fourth voltage source to the input of said second voltage responsive means; and fourth motive means connected to the output of said second voltage responsive means, responsive only to signals of said second characteristic and its opposite and operable to vary the magnitude of said sixth source of voltage.

References Cited in the file of this patent

UNITED STATES PATENTS

| | | |
|---|---|---|
| 2,478,671 | Smith | Aug. 9, 1949 |
| 2,751,921 | Baldwin | June 26, 1956 |